P. H. Roots.
Turbine Wheel.

No. 3,621. Reissued Aug. 24, 1869.

Witnesses,
H. Tusch
W. Smith

Inventor:
P. H. Roots

N. PETERS, PHOTO-LITHOGRAPHER, WASHINGTON, D. C.

UNITED STATES PATENT OFFICE.

P. H. ROOTS, OF CONNERSVILLE, INDIANA, ASSIGNOR TO HIMSELF AND F. M. ROOTS, OF SAME PLACE.

IMPROVEMENT IN WATER-WHEELS.

Specification forming part of Letters Patent No. 23,267, dated March 15, 1859; Reissue No. 918, dated February 28, 1860; Reissue No. 3,621, dated August 24, 1869.

*To all whom it may concern:*

Be it known that I, P. H. ROOTS, of Connersville, in the county of Fayette and State of Indiana, have invented a certain new and useful improved machine capable of operating as a water-wheel or rotary blower; and I do hereby declare that the following is a full, clear, and exact description of the construction and operation of the same, reference being had to the annexed drawings, making part of this specification, in which—

Figure 1:
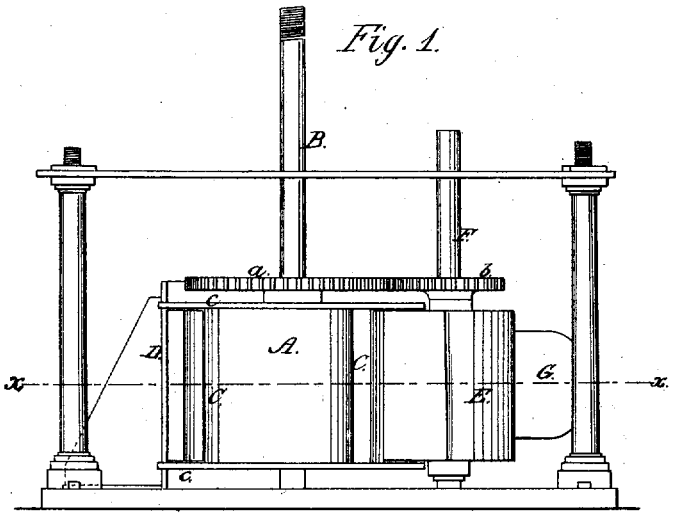
Figure 2:
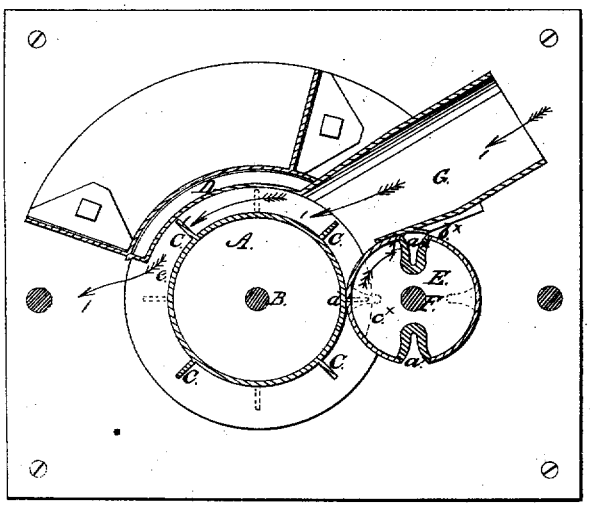

Figure 1 is a side view of my invention. Fig. 2 is a horizontal section of the same, taken in the line *x x*, Fig. 1.

Similar letters of reference indicate corre sponding parts in the two figures.

This invention consists in using in connection with a horizontal wheel, provided with radial buckets or arms, a rotating breast or abutment, and a concave or apron, arranged substantially as hereinafter shown and described, whereby the water is made to act in a very direct and efficient manner on the wheel.

To enable those skilled in the art to fully understand and construct my invention, I will proceed to describe it.

A represents a horizontal wheel, B its shaft, and C are buckets or arms, which are attached radially to the wheel, as shown plainly in Fig. 2. The wheel A may be of any proper dimensions, according to the power required or the volume or supply of water which is to drive it, or depending upon the amount of blast requisite when the machine is used as a rotary blower.

D is an apron or concave, which is placed at one side of the wheel A and at such a distance from it as to allow the ends of the buckets or arms *c* to just clear it as the wheel rotates. (See Fig. 2.)

E is a cylinder, which is placed vertically by the side of the wheel A, and is made to rotate simultaneously with it by means of gearing *a b*, the wheel *a* being on the shaft B of the wheel A, and the wheel *b* on the shaft F of the cylinder E. The wheel *a* is considerably larger than B, so as to give the cylinder E a quicker motion than the wheel A, the periphery of the former having a motion about one-third quicker than that of the latter. The periphery of the cylinder E just touches that of the wheel A, and the cylinder has two recesses, $a^{\times}$ $a^{\times}$, made in it to receive the buckets or arms C, and thereby permit the running of the wheel and cylinder in contact. This will be clearly understood by referring to Fig. 2.

G is a pipe which is placed between the cylinder E and the end of the apron D and communicates with the space between the periphery of the wheel A and the apron, said space being inclosed at its top and bottom by projecting rims or flanges *c c* on the wheel A, or by corresponding projectings on the apron or concave. Said pipe G, when my improved machine is used for a water-wheel, serves for an induction-pipe to convey the water into the wheel A, and when the machine is used as a blower said pipe will answer as a conduit to lead the blast from the wheel A to the furnace or forge where it is to be used.

The apron D and cylinder E occupy a space extending about half of the circumference of wheel A—that is, estimating from the points of contact *d* of the cylinder E and wheel A to the end of the apron or concave. (See Fig. 2.)

The operation of my machine when used as a water-wheel is as follows: The water passes through the induction-pipe G, between the wheel A and apron D, and acts directly against the buckets within said space, the wheel A being thereby rotated and the water escaping at the orifice *e*. The apron D and cylinder E confine the water so as to cause it to act on the buckets, the cylinder E serving as a breast or abutment at the junction of the induction-pipe with the apron or concave.

The operation of the machine when used as a rotary blower is directly the opposite of the above—that is, the cylinder E and wheel A are each moved in an opposite direction from what they are moved when the machine is used as a water-wheel, each performing, however, the same function substantially in both uses, the air entering in the one use where the water leaves it in the other, and the air leaving it in the former case where the water enters it in the latter.

It is essential that the rotary breast or abutment E have a quicker speed than the wheel in order to permit the recesses *a a* that receive the buckets or arms to be as narrow as possible. If the periphery of the cylinder E moved only with a speed equal to that of A, very large recesses would be required, as indicated by the line $c^{\times}$, in Fig. 2, in order that the buckets, when the machine is used as a water-wheel, might be received, and as these recesses fill with water and are discharged as they pass out of the water-way at $b^{\times}$, (see Fig. 2,) it follows, as a matter of course, that a considerable portion of the water would be lost, and when the machine is used as a rotary blower, a similar inconvenience would be experienced, if the recesses were large, from the loss of compressed air. By increasing the speed of the breast or abutment this difficulty is avoided, and, as previously stated, the speed of the breast or abutment should exceed that of the wheel about one-third.

When the machine is used as a water-wheel, the black arrows 1 indicate the direction of the movement of the water and the black arrows 2 indicate the direction of the movement of the breast or abutment E, the wheel of course moving in the same direction as the water, as indicated by black arrows 1; and when it is used as a rotary blower the red arrows 1 indicate the direction of the movement of the air and the red arrows 2 indicate the direction of the movement of the breast or abutment E.

By this invention, when used as a water-wheel, the water is made to act in a very direct manner on the wheel A, but little power is lost by friction, and the water is not allowed to act as a "drag" on the wheel, but is discharged as soon as the most available part of its force is expended on the buckets. The enlarged recess *n* in the abutment shows the forms in which said recesses must be made when the buckets are widened to the outer circle, *n'*. The buckets may be made wider or narrower at pleasure by making a corresponding change in shape and dimensions.

The wheel and abutment may be placed on a horizontal shaft, if desired.

The apron D and the recesses in the cylinder E are made of soft metal, as shown in blue in the drawings. This answers equally well for either purpose with cast hard metal, and, from an economical point of view, is better; but its special advantage consists in the fact that it can be cast of the proper form and with a sufficient surface, thus obviating the labor and expense of turning it true, which would be necessary if hard metal were used for that purpose.

The shortness of the arc D or apron has been above referred to as an advantage when the machine is used as a water-wheel. It is also a useful device in the machine when used as a rotary blower, as well from the fact of its answering the purpose equally well as if it was larger, as at the same time being more economical of labor and material.

As is clearly shown, the soft-metal lining is made to adhere firmly to the exterior covering of the case D. The inner surface of this lining shows that it was cast, and not dressed, to the proper concave and dimensions, and necessarily on a suitable cylindrical core, and that when the exterior covering of the case or apron and the cylindrical core are placed in the right position to each other, then the melted metal is poured in to fill up the intervening space. Thus the interior of the concave D is rendered true and accurate and by a single process is made to conform to the exterior peripheries of the buckets.

It is also apparent that the utmost exactness is required in both the form and position of the recesses *g g'*, in order that the buckets or wings of the wheel may pass them smoothly and without allowing any backward escapement of water or air. It is also evident that these recesses were cast in their proper form and place by arranging cores of the exact shape and in the exact position required. It is also shown that a suitable space is allowed around the cores to admit of and support the metal, and that when the cores are arranged in their proper position the melted metal is poured around them. Thus the necessary accuracy is attained at a great saving of labor over the process of dressing them out.

Having thus described my invention, what I claim as new, and desire to secure by Letters Patent, is—

1. The wheel A and rotary breast or abutment E, moving with different degrees of velocity, in combination with the apron or concave D, arranged to operate substantially as and for the purpose set forth.

2. The wheel A and rotary breast or abutment E, in combination with the apron or concave D, having its interior surface lined and rendered true with soft metal, substantially as and for the purpose set forth.

3. The wheel A and rotary breast or abutment E, having its recesses *g g'* lined with soft metal, in combination with the concave or apron D, arranged to operate substantially as and for the purpose described.

P. H. ROOTS.

Witnesses:
S. S. MORRIS,
JAMES MOORE.